INVENTOR.
WALTER B. SPATZ
BY
Bernard Kriegel
ATTORNEY.

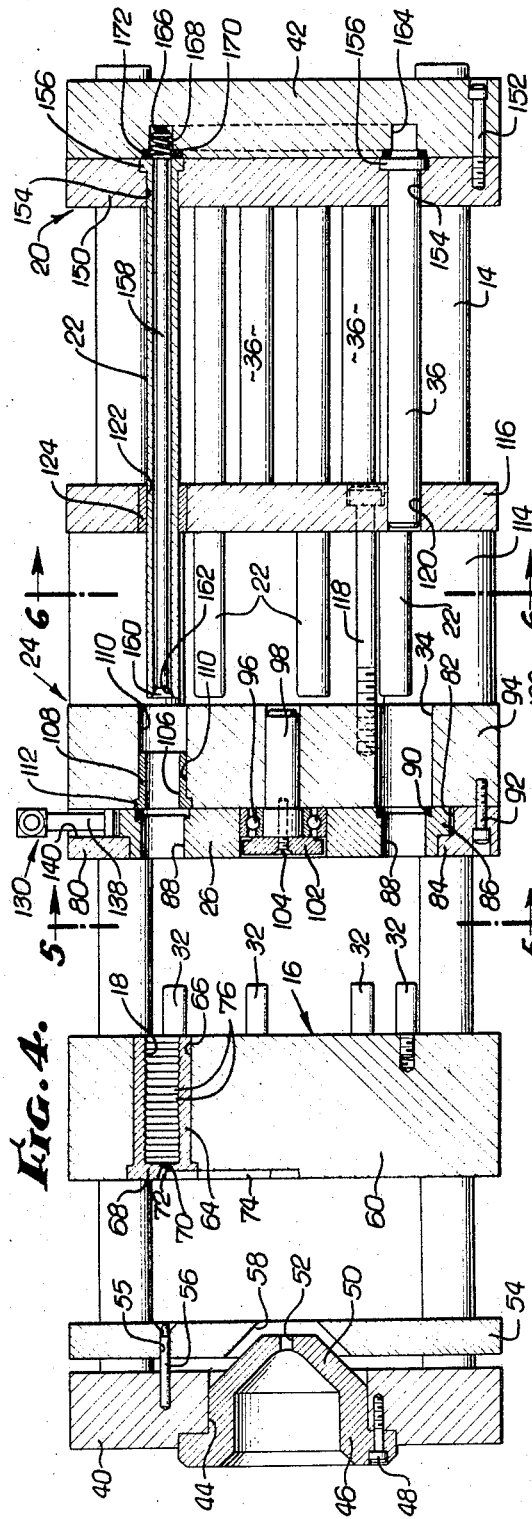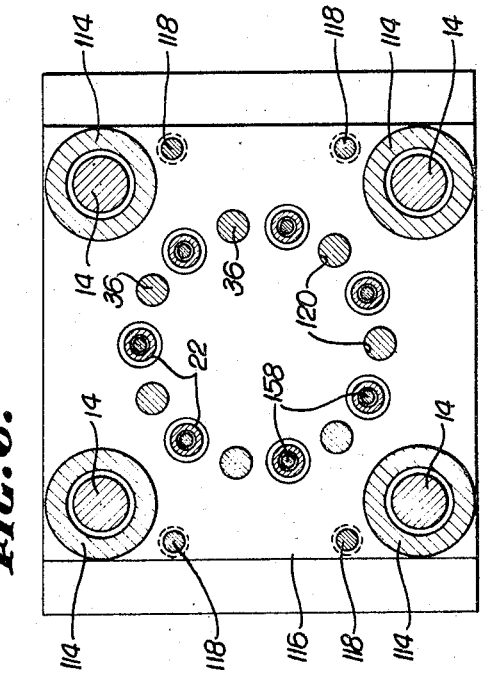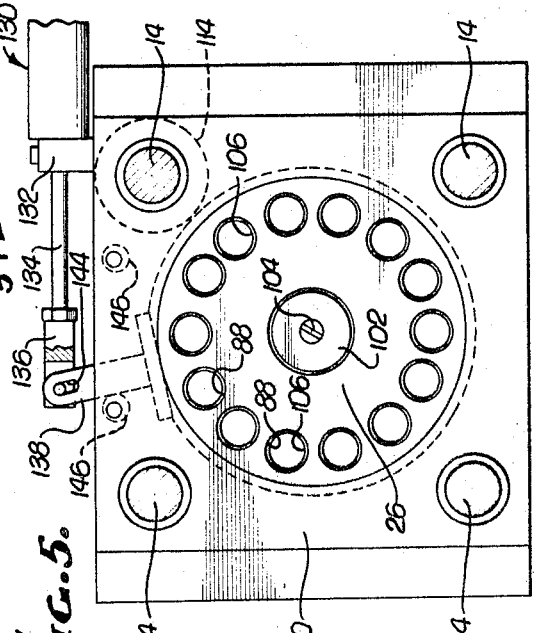

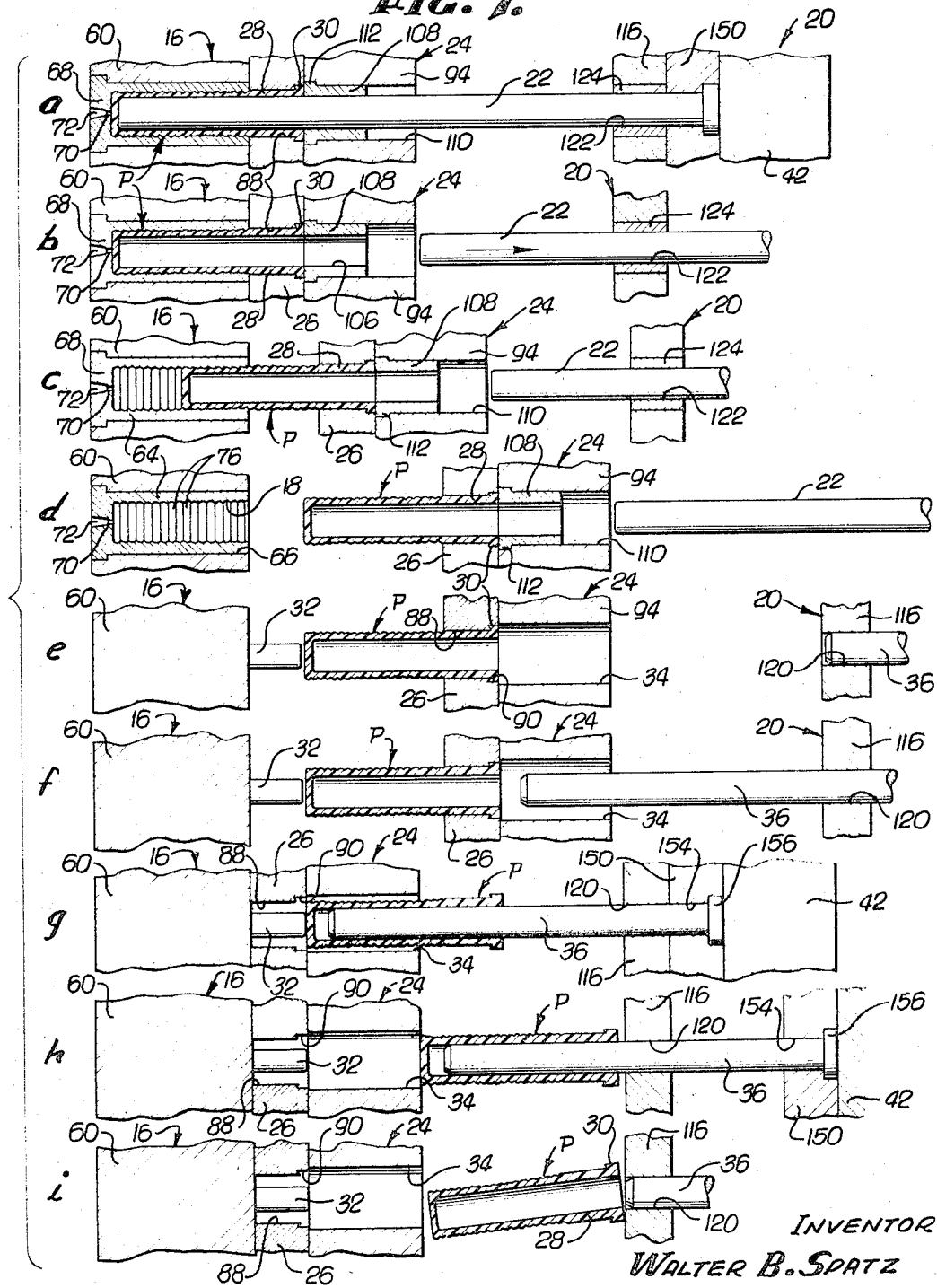

United States Patent Office 3,424,831
Patented Jan. 28, 1969

3,424,831
METHODS FOR INJECTION MOLDING
Walter B. Spatz, Santa Monica, Calif., assignor to Spatz Laboratories, Venice, Calif., a corporation of California
Filed July 11, 1966, Ser. No. 564,057
U.S. Cl. 264—138     11 Claims
Int. Cl. B29d 23/02; B29f 1/14

ABSTRACT OF THE DISCLOSURE

The method of and apparatus for molding a hollow flexible part having wall surface irregularities projecting transversely of the axis of the part, by molding on the part an axial extension which exerts an axial force for removing the part from the mold cavity upon separation of the mold sections which form the body and the extension respectively.

---

The present invention relates generally to injection molding, and more particularly to methods for injection molding a generally cylindrical, hollow, flexible part having projecting portions extending transversely of its axis, and for readily removing the part from the mold.

It is relatively easy to injection mold a generally cylindrical, hollow, flexible object or part, such as a lipstick cover, having flutes or grooves extending parallel to the axis of the part. Difficulty has been encountered in injection molding a part having projections or grooves that extend transversely to the axis of the part. The first-mentioned type of parts have been injection molded in a mold having one or more cylindrical cavities that can be opened at one end for removal of the molded part or parts. However, transversely extending projections or undercuts have been thought to prevent endwise removal of such a part from the mold, requiring the use of relatively costly and complex sectioned molds, which greatly increase the cost of producing the parts, or requiring rotary motion to remove the part in the instance of an externally threaded part.

The form of the present invention shown in the drawings contemplates the injection molding, in a solid cavity-defining mold, of a generally cylindrical, hollow, flexible object or part having external enlargements or undercuts extending transversely to the axis of the part, and the ready removal by axial, non-rotary motion of the part from its mold cavity. The part is molded with an integral extension, and after the center core is removed from the part to leave its walls unsupported against inward deflection, the extension is used to pull the part out of the mold cavity, the part deflecting laterally inwardly to a sufficient extent in effecting its removal from the mold.

It is an object of the invention to provide improved methods for injection molding a part, particularly a part having transverse surface relief, projections, undercuts thereon.

Another object of the invention is to provide such methods for injection molding a generally cylindrical, hollow, flexible part with projections or undercuts extending transversely to its axis, with the part being injection molded in a solid cavity-defining mold and being stripped from the mold by endwise, straight-line motion.

It is another object of the invention to provide such methods for injection molding a generally cylindrical, hollow, flexible part having projections or undercuts extending transversely to its axis and also having an extension to facilitate stripping or removal of the part from the mold cavity by exerting an outward pull on the extension.

This invention possesses many other advantages and has other objects which may be made more clearly apparent from a consideration of a method embodying the invention. This method is shown and described in the present specification and in the drawings accompanying and constituting a part thereof. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 4 is a longitudinal section through the molding assembly in the open position shown in FIG. 2, parts being shown in elevation;

FIG. 5 is a cross-section taken along the line 5—5 on FIG. 4;

FIG. 6 is a cross-section taken along the line 6—6 on FIG. 4; and

Figure 1:
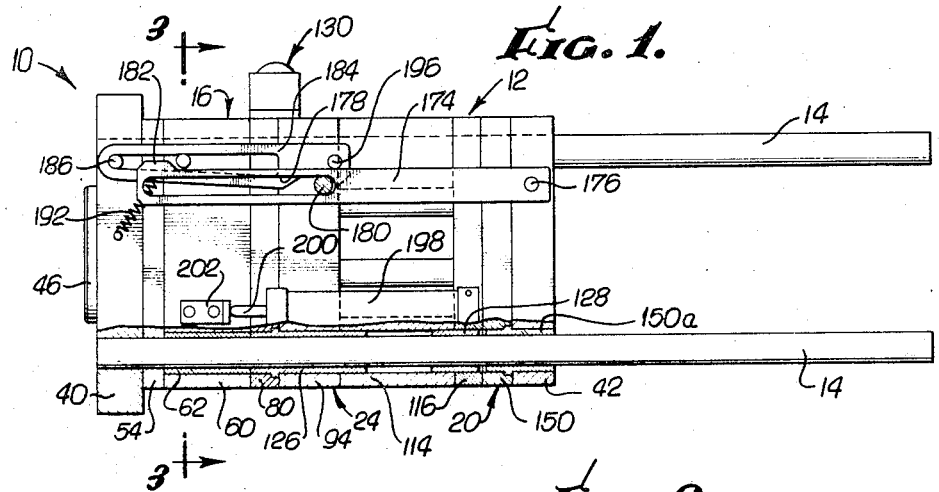
FIGURE 1 is a side elevational view, with parts broken away and in section, of the molding assembly of an injection molding machine, showing the mold in a closed and latched condition.

FIGS. 7a, b, c, d, e, f, g, h, i illustrate successive positions of elements of the molding assembly incident to its operation.

In general, the injection molding apparatus or mechanism 10 shown in the drawings includes several molding sections 12 slidably mounted on horizontal guide rods 14 for longitudinal movement toward and away from one another. A cavity section 16 defines a plurality of rearwardly opening, generally cylindrical mold cavities 18 adapted to be connected to a supply of viscous thermoplastic material under pressure to injection mold parts P within the cavities. Each cavity 18 has undercuts extending transversely of its axis. A pin mounting section 20 supports core pins 22 that are each movable into and out of one of the mold cavities 18. The core pins 22 extend through a stripper section 24 that includes a rotatable vertical stripper plate or wheel 26. With the core pins 22 in their respective associated cavities 18, and with the stripper plate 26 abutting the cavity section 16, a generally cylindrical, hollow part P is injection molded in each cavity. Each part includes an integral extension 28 having a collar 30 at its outer end (FIG. 7a). After the core pins 22 are removed to leave the walls of the parts unsupported against inward deflection (FIG. 7b), the stripper section 24 is moved away from the cavity section 16 to strip or pull the parts from their respective cavities 18 (FIGS. 7c, 7d). The stripper plate is then rotated to align each molded part P at its forward end with an ejector stud 32 on the cavity section 16, and at its rearward end with a pass-through opening 34 in the stripper section 24 (FIG. 7e). A pick-up pin 36 on the pin mounting section 20 is moved into each pass-through opening 34 (FIG. 7f) after which the stripper section 24 and the pick-up pin 36 are moved toward the cavity section 16 and the ejector stud 32 to push the molded part P rearwardly through the pass-through opening 34 and onto an associated pick-up pin 36 (FIG. 7g). The pick-up pin 36 is then moved rearwardly to first withdraw the molded part P from the pass-through opening 34 (FIG. 7h), the pick-up pin itself then being removed from the part (FIG. 7i), allowing it to drop into a suitable container (not shown).

The molding sections 12 shown in the drawings are mounted on the guide rods 14 between a fixed forward clamping plate 40 and a movable rearward clamping plate 42. The movable clamping plate 42 reciprocates toward and away from the forward fixed clamping plate 40 to close and open the molding assembly, as will be explained more fully. As shown in FIGS. 3, 5 and 6, the guide rods 14 are arranged in a generally square or rectangular configuration. As shown in FIG. 4, the vertical rectangular fixed forward clamping plate 40 is secured to the forward end of the guide rods 14, having a central aperture 44 in which an injection nozzle 46 is secured, as by means of screws 48. The nozzle 46 has a rearwardly directed frusto-conical nose portion 50 with a discharge orifice 52 at its center. The inlet end of the nozzle 46 is adapted to be connected to a suitable supply of heated viscous thermoplastic material under pressure (not shown), suitable control means (not shown) being provided to control the flow of thermoplastic material to the nozzle 46. A vertical rectangular sprue stripper plate 54 is slidably mounted on the guide rods 14 immediately to the rear of the fixed clamping plate 40 for limited movement between a closed forward position (FIG. 1) abutting the plate 40 and a rearward open position (FIGS. 2 and 4) spaced a short distance rearwardly from the plate 40. The stripper plate 54 has circularly arranged apertures 55, a ball-headed pin 56 secured to the fixed stripper plate 40 extending slidably through each aperture 55. The sprue stripper plate 54 is also provided with a central opening 58 for receiving the nozzle 46. The action of the sprue stripper plate 54 incident to the operation of the apparatus serves to separate the sprue from the nozzle and from the molded parts after each molding operation.

The cavity mold section 16 comprises a generally vertical rectangular cavity plate 60 movably mounted on the guide rods 14 on suitable bushings 62 (FIGS. 1 and 3) for forward and rearward longitudinal movement. The cavity plate 60 has circumferentially arranged generally cylindrical rearwardly open mold cavities 18, as shown in FIG. 3, each of which is longitudinally aligned with one of the pins 56. More particularly, each mold cavity 18 is provided by a generally cylindrical, hollow cavity insert 64 secured in a cavity aperture 66 in the cavity plate 60. Each cavity insert 64 opens rearwardly and has an end wall 68 at its forward end provided with a peripheral flange received in a counterbore at the forward end of the aperture 66. The wall 68 has a gate 70 communicating with the interior of the mold cavity 18 and with a subgate or well 72 that communicates with a radially extending runner passage 74 extending radially inwardly to the center of the cavity plate 60 in longitudinal alignment with the orifice 52 of the nozzle 46.

The interior of each cavity insert 64 defines a generally cylindrical mold cavity 18 having circumferential grooves 76 along its entire length to define circumferential ribs along the length of the cylindrical part P to be molded in the cavity. The circumferential grooves are shown by way of example only, since the invention contemplates the use of other specific mold shapes capable of producing projections on molded parts extending transversely of the mold axis.

Circumferentially spaced ejection studs 32 are threadedly connected to and extend rearwardly of the cavity plate 60, lying on the same circle as the mold cavities 18, and being arranged alternately or intermediate the mold cavities.

The stripper section 24 includes a rectangular vertical stripper retaining plate 80 having an inwardly directed retaining flange 84 disposed around the forwardmost edge of a circular central opening 82, in which the rotatable vertical circular stripper plate or wheel 26 is disposed. The stripper plate 26 has an external peripheral flange 86 engaging the flange 84 of the stripper retaining plate 80. The stripper plate 26 is provided with generally cylindrical, horizontally extending openings 88 spaced equidistant from each other and arranged on a circle having the same diameter as the circle of the mold cavities 18 and ejection studs 32, being alignable with such mold cavities and studs. Each of the stripper openings 88 is provided with an annular collar groove 90 at its rearward end, the diameter of the main portion of each stripper opening 88 being approximately the same or slightly larger than the diameter of each mold cavity 18.

The stripper retaining plate 80 is suitably secured, as by screws 92, to a square vertical forward support plate 94 to thereby contain the stripper plate 26 within the central opening 82. The stripper plate 26 is mounted for rotation, through the agency of a ball bearing 96, on the forward end of a stud 98 mounted centrally thereof and in the forward support plate 94. A retainer disc 102 is secured by a screw 104 to the forward end of the stud 98 to retain the ball bearing 96 in place.

The forward support plate 94 includes circumferentially spaced, pass-through openings 34 which are each longitudinally aligned with one of the ejection studs 32, and each having a diameter slightly larger than the diameter of an associated annular collar groove 90 in the stripper plate 26. The forward support plate 94 also has circumferentially spaced restricted openings 106 that are each longitudinally aligned with one of the mold cavities 18 and of smaller diameter than an opening 88. Each of the restricted openings 106 is defined by a cylindrical guide bushing 108 supported in an aperture 110 in the support plate, each guide bushing having an outwardly extending flange 112 at its forward end received in a counterbore at the forward end of the associated aperture 110.

The stripper section 24 also includes cylindrical spacer columns 114 disposed around each of the guide rods 14, and a rear support plate 116 connected to the front support plate 94 by screws 118. The rear support plate 116 is provided with pick-up pin guide apertures 120 that are each longitudinally aligned with one of the pass-through openings 34 in the forward support plate 94 and with one of the ejection studs 32. The rear support plate 116 is also provided with core pin guide apertures 122 provided in liner bushings 124 aligned with guide bushings 108 in the forward support plate 94 and with the mold cavities 18.

The stripper plate 26, the stripper retaining plate 80, the front and rear support plates 94, 116, and the spacer columns 114, which comprise the stripper section 24, are supported on the guide rods 14 by front and rear bushings 126, 128 (FIG. 1) for forward and rearward longitudinal movement as a unit.

As shown best in FIGS. 4 and 5, the means for rotating the stripper plate 26 comprise a top cylinder and piston device 130 mounted by means of a bracket 132 at the top of the stripper retaining plate 80 for reciprocating transverse horizontal movement of the piston (not shown) and piston rod 134 of the device. A bifurcated fork 136 at the outer end of the piston rod 134 receives the upper outer end of a rocker arm 138 suitably secured to the periphery of the stripper plate 26 and extending through a passage 140 in the upper portion of the stripper retaining plate 80 (FIG. 4). The upper end of the rocker arm 138 is provided with a slot 142 which receives a pin 144 extending between the arms of the fork 136 (FIG. 5). A pair of stop pins 146, which may be adjustably positionable, are mounted in the upper passage 140 of the stripper retainer plate 80 to limit the movement of the rocker arm 138 and the rotation of the stripper plate 26. This serves to define the two rotational positions of the stripper plate 26. The stop pins 146 permit sufficient rotation for the plate 26 to move between a first position where alternate stripper openings 88 are aligned with mold cavities 18, and the intervening stripper openings are aligned with ejector studs 32 and a second position where the alternate stripper openings are aligned with the ejector studs, and the intervening openings are aligned with mold cavities.

The pin support or mounting section 20 comprises the rear movable clamping plate 42 to which a vertical rectangular pin retaining plate 150 is secured, as by means of screws 152, for common longitudinal movement along the guide rods 14. The pin mounting section 20 is supported on the guide rods by suitable bushings 150a, as shown in FIG. 1. In general the pin mounting section 20 supports core pins 22 in longitudinal alignment with the respective mold cavities 18 and pick-up pins 36 in longitudinal alignment with the ejector studs 32. More particularly, the pin retaining plate 150 has apertures 154 which each receive the rear portion of one of the core pins 22. Each core pin 22, which is a hollow cylinder, is provided with an outwardly extending peripheral flange 156 at its rearward end received in a counterbore at the rearward end of the associated aperture 154.

The core pins 22 extend through the bushings 124 (FIG. 4), and when the pin mounting section 20 is moved forwardly, the core pins also extend through the guide bushings 108 and stripper openings 88 into the mold cavities 18 (FIGS. 1 and 7a). A valve pin 158 extends through the central bore of each of the core pins 22, each valve pin 158 having a valve head 160 at its forward end for seating against a valve seat 162 at the forward end of the associated core pin 22. The rear end of the valve pin 158 extends rearwardly of the rear end of the core pin into an annular recess 164 in the movable clamping plate 42. A retaining washer 166 is secured to the end of the valve pin 158, and a coil spring 168 is disposed around the rear end of the valve pin within the recess 164, bearing against the rear end of the core pin and the washer 166 to urge the valve pin rearwardly and engage the head 160 with the seat 162. The recess 164 is in continuous communication with a suitable source (not shown) of compressed air. A pair of seal rings 170, 172 are disposed in annular channels in the movable clamping plate radially inwardly and outwardly of the annular recess 164, formig a seal between the movable clamping plate 42 and the pin retaining plate 150.

The pick-up pins 36, which are supported at their rear ends by the pin retaining plate 150 in the same manner as the core pins 22, extend longitudinally through the respective pick-up pin guide openings 120 in the rear support plate 116. When the pin mounting section 20 is moved forwardly, the pick-up pins 36 extend into the pass-through openings 34 in the stripper section (FIGS. 1 and 7f). The diameter of the pick-up pins 36 is somewhat smaller than the inner diameter of the molded parts to permit clearance for escape of air when the pick-up pins are inserted into the parts.

Figure 2:
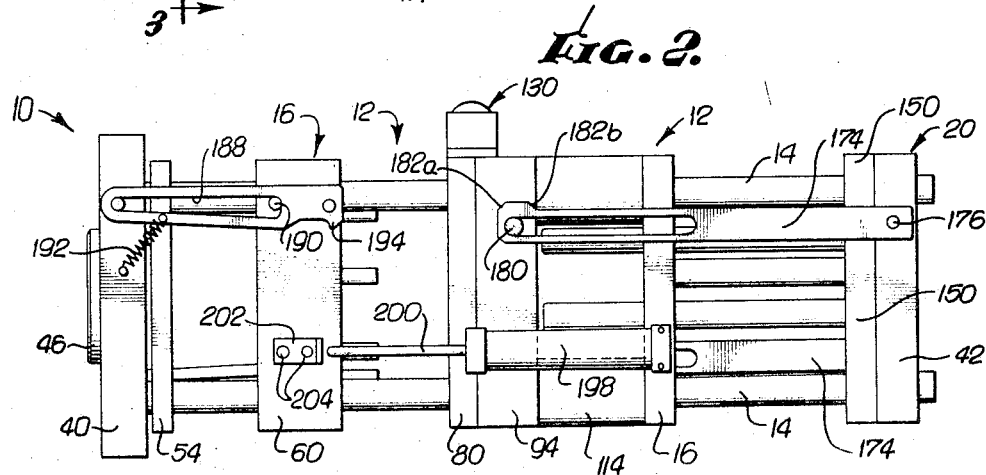
FIG. 2 is a side elevational view similar to FIG. 1, showing the molding assembly in a fully open position.
Figure 3:
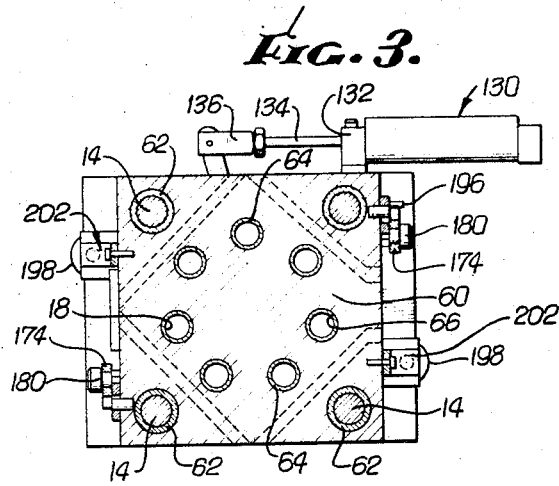
FIG. 3 is a cross-section taken along the line 3—3 on FIG. 1.

FIGS. 1, 2 and 3 illustrate the means for interconnecting the sections of the molding mechanism 10. As noted above, the pin mounting section 20 moves longitudinally forwardly and rearwardly with a reciprocating stroke, under the control of other known portions of the injection molding machine. A pair of horizontally extending rear links 174 interconnect the pin mounting section 20 and the stripper section 24. As shown in FIG. 3, one of the rear links 174 is positioned at the upper portion of one side of the molding mechanism, while the other rear link 174 is disposed at the lower portion of the other side of the molding mechanism. The rear links 174 are generally alike and, therefore, only one will be described in detail. The rear link 174 is pivotally connected at its rear end to the side of the movable clamping plate 42 by a pivot pin 176. The forward portion of the rear link has a longitudinally extending slot 178 which receives a connector pin 180 secured to and extending outwardly from the side of the front support plate 94 of the stripper section 24. The rear link 174 also includes an upwardly extending latch or projection 182 at its forward end, the latch 182 having forward and rearward cam surfaces 182a, 182b. The slot 178 is proportioned to permit the movable clamping plate 42 to move all of the sections and plates of the mold mechanism forwardly into abutting closed relationship, as shown in FIG. 1, at the forward end of its stroke. Rearward movement of the movable clamping plate 42 retracts the core pins 22 and pick-up pins 36 and then engages the connector pin 180 with the forward end of the slot 178 to withdraw the stripper section 24 rearwardly to the position shown in FIG. 2.

A pair of horizontally extending forward links 184 are pivotally mounted at their forward ends on pivot pin 186 secured to opposite sides of the fixed clamping plate 40, the links 184 being adapted to be positioned inwardly of and in overlapping relation to the rearward links 174 when the molding mechanism is closed, as shown in FIG. 1. Since the forward links 184 are generally alike, only one of these links will be described in detail. The forward link 184 has a longitudinal slot 188 receiving the pin 186 and a pin 190 fixed to and extending outwardly from the side of the cavity plate 60, the slot increasing in width from its forward to its rearward end. A suitable spring 192 urges the rearward end of the link 184 downwardly so that the pin 190 on the cavity plate normally abuts the upper edge of the slot 188. The rearward end of the forward link 184 has a downwardly projecting latch finger 194 adapted to engage the connector pin 180 on the stripper section 24 when the stripper section is moved forwardly to a closed position as shown in FIG. 1. A release or camming pin 196 is also provided at the rearward end of the forward link 184, the camming pin 196 extending outwardly into the path of the cam actuator 182 on the associated rearward link 174, so that movement of the actuator 182 in either direction past the camming pin pivots the rearward end of the forward link 184 upwardly about the pivot pin 186 and serves to unlatch or facilitate the latching of the latch finger 194 of the forward link 184 with respect to the connector pin 180.

A side cylinder 198 is mounted on each side of the stripper section 24, one side cylinder being at the lower portion of its side and one being at the upper portion of its side, in reverse of the positions of the links 174, 184. Each of the side cylinders 198 contains a normally forwardly biased piston (not shown) and piston rod 200 extending therefrom (FIG. 2). An L-shaped stop bracket 202 is mounted, as by means of screws 204, on the side of the cavity plate 60, with one leg of the bracket 202 extending outwardly in line with the piston rod 200 to shift the piston rod within its cylinder when the molding assembly is closed as shown in FIG. 1.

The operation of the injection molding apparatus or assembly 10 may now be readily understood. FIGURES 1 and 7a show the assembly in its closed position, which occurs at the end of a forward stroke of the molding machine. The movable rear clamping plate 42 is moved forwardly as far as possible, to position the pin mounting section 20, the stripper section 24, the cavity section 16, the sprue stripper plate 54, and the forward fixed clamping plate 40 in successive abutment with one another. The small ball heads of the pins 56 extend into the wells 72, and the orifice 52 is abutting directly the radially inward ends of the runner passages 74. Each core pin 22 extends through a guide bushing 108 in the stripper section in substantially close sliding contact, and extends centrally through a stripper opening 88 in the stripper plate 26 defining an annulus region around it for the formation of the cylindrical extension 28 and the collar 30. Each core pin 22 further extends into a mold cavity 18, stopping short of the forward end wall of the cavity to permit room for the formation of an end wall for the molded part P. An annulus region is also defined around the core pin 22 within the mold cavity 18 for formation of the cylindrical side wall of the molded part integrally connected to the end wall and to the extension 28.

Thermoplastic molding material in a fluid state is then injected into the nozzle 46, and through its orifice 52, the passages 74, wells 72, and the gates 70 into all of the mold cavities 18, the plastic material also flowing into the stripper openings 88 and the annular collar grooves 90 around the core pins 22, to injection mold the generally cylindrical, hollow, flexible walled parts P, each part having a cylindrical extension 28 and a collar or flange 30.

The high pressure of the molding material (e.g., 10,000 to 20,000 p.s.i.) urges the valve heads 160 rearwardly against their seats 162 to insure that no molding material enters the interior of the core pins 22.

Following injection of the thermoplastic resin into the molds, the molding machine begins a rearward stroke, the movable clamping plate 42 being moved rearwardly to withdraw the core pins 22 from the interiors of the molded parts, as shown in FIG. 7b. As noted above, the core pins 22 are provided with a constant air pressure (e.g., 100 p.s.i.), and as the withdrawal of the core pins from the molded parts tends to create low pressure regions within the parts, the valve pins 158 tend to move forwardly slightly to unseat the valve heads 160 and allow compressed air to enter the molded parts, preventing creation of low pressure regions or a suction within the parts which might pull them inwardly and result in their deformation. Withdrawal of the core pins leaves the walls of the molded parts generally unsupported against inward deflection or movement. Engagement of the latch fingers 194 of the forward links 184 with the connector pins 180 (FIG. 1) will keep the stripper section 24 abutted with the cavity section 16 until the core pins 22 have been withdrawn from the parts. When the movable clamping plate 42 moves rearwardly sufficiently for the rearward cams 182 on the links 174 to engage the actuating pins 196 on the pivoted forward links 174 to engage the actuating pins 196 on the pivoted forward links 184, the latter are tilted upwardly to release the stripper section 24, as well as the cavity section 16 and the sprue stripper plate 54, for rearward movement.

Shortly after the cams 182 reach the actuator pins 196, further rearward movement of the movable clamping plate 42 will engage the ends of the link 174 defining the slots 178 against the connector pins 180 to pull the stripper section 24 rearwardly. The stripper plate 26 of the stripper section 24 is physically interconnected with the collars 30 formed at the rearward ends of the removal extensions 28 of the molded parts P. While rearward movement of the stripper section 24 thus produces a rearward linear pull on the molded parts rearwardly or outwardly of their mold cavities, the resistance to separation between the parts and the cavity section 16 (to a substantial extent because of the transversely extending ribs or flutes) causes the cavity section to move rearwardly with the stripper section. This rearward movement of the cavity section 16 tends to separate it from the sprue stripper plate 54 and to separate the latter plate from the fixed clamping plate 40. As noted above, the opening between the fixed clamping plate 40 in the sprue stripper plate 54 and the cavity plate 60 tends to separate the sprue from the cavity plate 60, as well as from the nozzle 46 on the fixed clamping plate 40. In this connection, the ball heads of the pins 56 are embedded in the mold material in the wells 72 and serve to pull the sprues from the cavity plate 60 as the opening is developed between the cavity plate and the stripper plate 54. When the stripper plate 54 separates from the fixed clamping plate 40, the well and sprue material is stripped from the pins 56 and the sprue material is stripped from the nozzle 46. When the cavity plate 60 is moved rearwardly to the position shown in FIG. 2, its further rearward movement is stopped by engagement of the pins 190 with the forward links 184 at the ends of the slots 188. Further rearward movement of the stripper section 24, caused by rearward movement of the movable clamping plate 42 acting through the rear links 174, necessarily separates the stripper section 24 from the cavity section 16. This exerts a straight-line longitudinal rearward pull on each of the molded parts P by virtue of the interconnection between the collars 30 and the stripper plate 26. The mold material is flexible and the prior removal of the core pins 22 permits the parts to deflect inwardly to release them from the molds and facilitate their removal therefrom by a straight-line, non-rotary pull without permanent damage or deformation of the parts.

Further, longitudinal or axial pull and resultant axial deformation of the parts will reduce the size of the parts radially to retract their transverse ribs from the mold grooves or undercuts and thereby facilitate their removal from the mold cavities. FIG. 7c shows a part partially removed from its cavity.

FIGS. 2, 4, and 7d illustrate the molding mechanism in its fully open or extended position at the end of the rearward stroke of the molding machine. It will be noted particularly that the core pins 22 are moved rearwardly to at least clear the rotatable stripper plate 26. The stripper plate 26 is then rotated a partial revolution through the actuation of the top cylinder and piston device 130 to position the molded parts in longitudinal alignment with the ejector studs 32, the pass-through openings 34 of the forward support plate 94 of the stripper section 24, and the pick-up pins 36 (FIG. 7e).

On the next forward stroke of the molding machine, the movable clamping plate 42 is moved forwardly to first move the pick-up pins 36 into the pass-through openings 34 in alignment with the molded parts P (FIG. 7f). The piston rods 200 extending from the side cylinders 198 are adapted to engage the brackets 202 to resist closing between the cavity section 16 and the stripper section 24 before the pin mounting section 20 closes against the stripper section 24. This is to insure that the pick-up pins 36 are positioned in the pass-through openings 34 before the parts P are introduced in these openings by the action of the ejector studs 32, since earlier introduction of the parts into the openings 34 could result in misalignment of and damage to the parts when the pick-up pins 36 enter the openings 34. Further forward movement of the movable clamping plate 42 pushes the stripper section 24 forwardly. Initially the piston rods 200 push the cavity plate 60 against the stripper plate 54 and the sprue stripper plate 54 against the fixed clamping plate 40. Further forward movement of the movable clamping plate 42 moves the stripper section 24 toward the cavity plate 60 and finally into abutment with the plate 60 against the resistance of the piston and cylinder device 198 to again achieve the closed condition of the molding assembly, as shown in FIG. 1. As shown in FIG. 7g, the ejector studs 32 abut the forward end walls of the molded parts P to restrain them from further forward movement while the stripper section 24, including the stripper plate 26, continues to move forwardly. This, in effect, pushes the molded parts P relatively rearwardly through the pass-through openings 34 of the front support wall 94 of the stripper section 24 and onto the forward ends of the pick-up pins 36.

With the molding assembly in the position disclosed in FIGS. 1 and 7g, thermoplastic material can be injected into the mold cavities which are now aligned with a set of stripper openings 88 and alternately around the assembly with openings 88 in which the parts P have just been molded and from which they have been ejected. The clamping plate 42 is then moved rearwardly on its return stroke, which not only withdraws the core pins 22 from the newly molded parts, as shown in FIG. 7b, but also withdraws the pick-up pins 36 with the parts P thereon, as shown in FIG. 7h, the stripper section 24 remaining in its forward closed position abutting the cavity section 16. The molded parts P are thus withdrawn rearwardly on the forward ends of the pick-up pins 36 out of pass-through openings 34. Further rearward movement of the movable clamping plate 42 abuts the rearward ends of the removal extensions 28 of the molded parts P against the forward surface of the rear support plate 116 of the stripper section 24, while the pick-up pins 36 withdraw through their guide openings 120 through that rear support plate 116. This releases or discharges the molded parts P in the area between the forward and rearward support plates 94, 116 of the stripper section, which is sufficiently wide to permit free downward passage of the molded parts (FIG. 7i). Suitable containers or transporting means (not shown) may be positioned below the molding mechanism to catch the falling molded parts for subsequent operations, which include the removal or severing of the extensions 28 from the main portions of the parts P.

Continued rearward movement of the movable clamp plate 42 effects release of the latches 194 from the pins 180 and rearward movement of the support plate 94 and puller disc 26 to strip the parts P from the mold cavity, as shown in FIGS. 7c, d. The disc 26 is then turned back a partial revolution to align the parts P with the ejector studs 32 and the cycle depicted in FIG. 7 repeated.

During the operation of the machine, for each forward and return stroke of the molding assembly, subsequent parts are injection molded while previously molded parts are stripped and discharged from the apparatus, the subsequent parts being alternately arranged with respect to the previously molded parts around the machine. In the specific apparatus disclosed in the drawings by way of example, seven parts are injection molded while seven previously molded parts are stripped and discharged.

I claim:

1. A method of producing a hollow walled part having a wall surface irregularity extending transversely of the axis of the part, comprising injecting material into a multiple piece mold having a core therein to form the part with an extension projecting from the part in an axial direction and having a portion on said extension interlocked with a piece of said multiple piece mold, withdrawing the core from the part, axially separating the mold pieces and thereby causing the pieces of the mold to exert an axially directed pull on the part and on the extension to deflect the wall of the part laterally of its mold piece to remove the part axially from its mold piece, and removing said extension from its mold piece.

2. The method of claim 1, including the further step of separating the extension from the part after removal of the part and the extension from the mold pieces.

3. A method of producing a hollow walled part having a wall surface irregularity extending transversely of the axis of the part, comprising injecting material into a multiple piece mold to form the part with an extension projecting from the part in an axial direction and having a portion interlocked with a piece of the multiple part mold, axially separating the pieces of the mold to exert an axially directed pull on the extension and part to deflect the wall of the part laterally of its mold piece and to remove the part axially from its mold piece, said surface irregularity being on the exterior of the part, a core being disposed in the mold piece of said part during the molding of the part, the core being removed from the part before the axially directed pull is taken, to permit such pull to effect an inward deflection of the wall of the part during axial removal of the part from its mold piece and removing the extension from its mold piece.

4. The method as defined in claim 3, including the step of separating the extension from the part.

5. A mehod of producing a hollow walled part having a wall surface irregularity extending transversely of the axis of the part, comprising providing a mold having a first portion conforming to the hollow wall part and a second portion for an extension to be integral with the part and projecting axially from the part, providing a core in said mold, injecting material into the space between said core and said first and second portions to form the part and extension integral therewith, withdrawing the core from the part, and relatively separating said first portion of said mold from said second portion to exert an axially directed pull on the extension and part to deflect the wall of the part laterally of the first portion of the mold and remove the part axially from the first portion, and removing the extension from its mold piece.

6. A method as defined in claim 5, wherein an axially directed force is imposed on said extension to remove said extension from said second mold portion after said part has been removed from said first mold portion.

7. A method as defined in claim 5, wherein an axially directed force is imposed on said extension to remove said extension from said second mold portion after said part has been removed from said first mold portion, and separating the extension from the part after removal of said extension from said second mold portion.

8. The method as defined in claim 5, wherein the surface irregularity is on the exterior of the part, the core being also removed from the second portion of the mold before separation of the first and second portions of the mold.

9. A method of producing a hollow walled part having a wall surface irregularity extending transversely of the axis of the part, comprising providing a mold having a first portion conforming to the hollow wall part and a second part for an extension to be integral with the part injecting material into said first and second portions to form the part and extension integral therewith, and relatively separating said first portion of said mold from said second portion to exert an axially directed pull on the extension and part to deflect the wall of the part laterally of the first portion of the mold and remove the part axially from the first portion, said wall surface irregularity being on the exterior of the part, a core being disposed in the first and second portions of the mold during molding of the part and extension, the core being removed from the first and second portions after the material has been injected thereinto and before relative separation between the first and second mold portions, to permit the axially direcetd pull on the extension and part to effect an inward deflection of the wall of the part during removal of the part axially from the first mold portion, and imposing an axially directed force on said extension to remove said extension from said second mold portion after the part has been removed from said first mold portion.

10. A method as defined in claim 9, including the step of separating the extension from the part after removal of the extension from said second mold portion.

11. A method as defined in claim 9, wherein the axially directed force on the extension to effect its removal from the second mold portion is a pushing force on the extension which shifts the part and extension axially completely through the second mold portion.

References Cited

UNITED STATES PATENTS

| 2,301,338 | 11/1942 | Smith | 18 |
| 2,856,632 | 10/1958 | Rekettye | 264—335 |

FOREIGN PATENTS

| 503,757 | 4/1939 | Great Britain. |

ROBERT F. WHITE, *Primary Examiner.*

J. H. SILBAUGH, *Assistant Examiner.*

U.S. Cl. X.R.

264—318, 328, 334; 18—2